United States Patent Office 2,746,987
Patented May 22, 1956

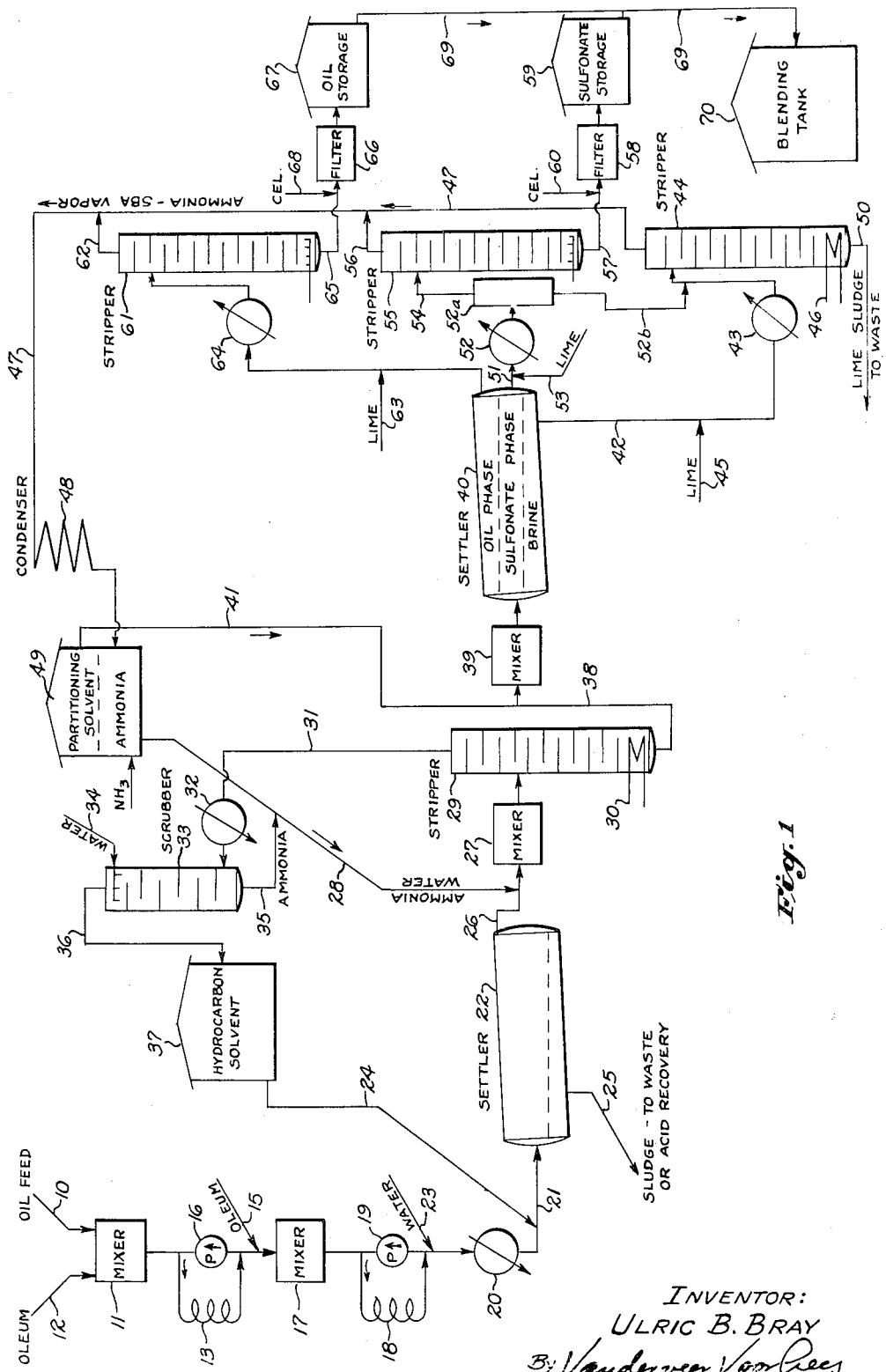

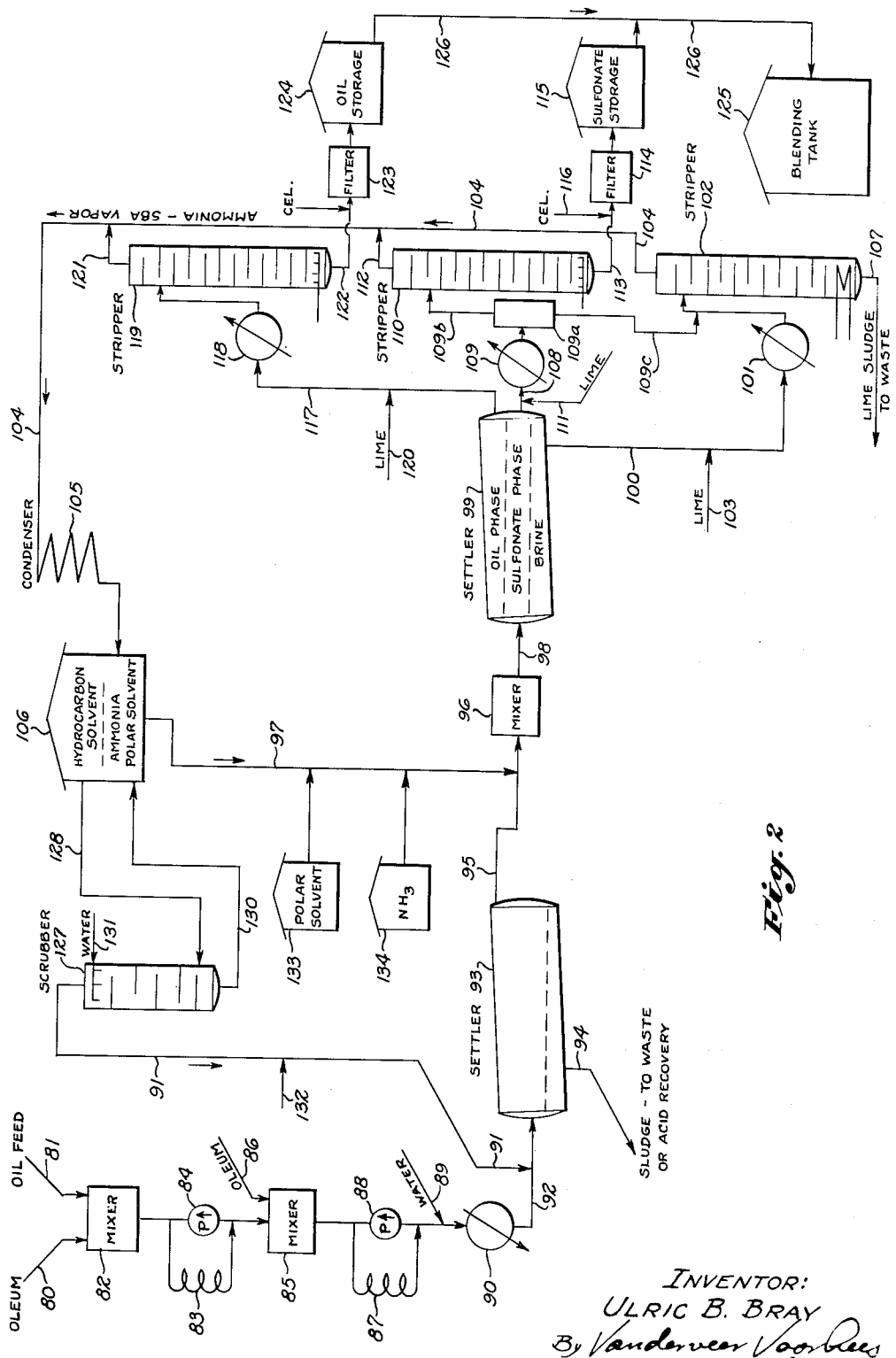

2,746,987

SULFONATE MANUFACTURE

Ulric B. Bray, Pasadena, Calif., assignor, by mesne assignments, to Bray Oil Company, Los Angeles, Calif., a limited partnership Application September 15, 1952, Serial No. 309,730

9 Claims. (Cl. 260—504)

This invention relates to a process of manufacturing sulfonic acids and sulfonates from hydrocarbons, particularly petroleum hydrocarbons. The invention also relates to the manufacture of oil soluble sulfonates of the alkaline earth metals, particularly calcium, barium and strontium. More particularly the invention relates to oil soluble sulfonates free from chlorides and suitable for use in compounded lubricants.

The invention is illustrated by drawings showing in Figure 1, apparatus for carrying out one modification of the process wherein a solvent alcohol is employed which is preferentially oil soluble having four to six carbon atoms in the molecule. Figure 2 shows an apparatus suitable for another modification wherein a preferentially water soluble alcohol is the solvent.

One object of the invention is to provide a process for making two or more sulfonates of different metals or ammonium from a given sulfonation mixture. Another object of the invention is to make calcium, barium or other sulfonate free of chloride ion. Still another object of the invention is to eliminate the use of costly alkali for neutralizing contaminating acid and sludge in the manufacture of sulfonic compounds.

It has heretofore been the practice to make sulfonates by treating a petroleum hydrocarbon fraction with fuming sulfuric acid, separating the sludge and unused acid and recovering the sulfonic compounds from the sludge and from the unsulfonated hydrocarbon. Preferentially water soluble or so-called "green acids" were found in the sludge while the preferentially oil soluble or "mahogany acids" were found in solution in the oil along with some contaminating green acids and sulfuric acid emulsified therein.

In most of the prior art, the sulfonates were merely a by-product from the manufacture of industrial and medicinal white oils. Recovery of the mahogany sulfonates has commonly been effected by washing the acid treated oil with caustic soda, then extracting the sulfonates with a solvent such as a mixture of water and a lower boiling alcohol, e. g., methanol, ethanol or isopropanol.

When desired, the soda mahogany sulfonate thus obtained has been converted into calcium, barium or other metal sulfonate by treatment with the appropriate salt, usually after purification to remove inorganic salts and green acid sulfonates. Thus, treatment with excess calcium chloride yields the calcium sulfonate and sodium chloride which is discarded with the excess calcium chloride. Attempts to avoid the waste of sodium hydroxide in this two stage neutralization and conversion, by direct neutralization of the sulfonic acid with lime have not been successful because of the formation of troublesome calcium sulfate slime and because of the difficulty of separating contaminating green acid sulfonates from the mahogany sulfonates when in the form of their calcium soaps.

I have now discovered that calcium, barium and other metal sulfonates can be made readily and in high state of purity by first neutralizing the sulfonic acid with ammonia. The ammonium soaps are easily purified, then converted into the desired metal sulfonate by reacting them with the appropriate metal hydroxide or oxide. The process will be easily understood by referring to the drawing. In Figure 1, a hydrocarbon oil is introduced by line 10 into mixer 11 where it is intimately mixed with fuming sulfuric acid introduced by line 12 at the rate of about 1 to 2.5 lbs. per gallon of oil. The oil employed may be a distilled lubricating fraction of crude petroleum, preferably a naphthenic crude, although various special hydrocarbon fractions can be used such as a sulfur dioxide extract or other solvent extract having a high content of aromatics. I may also employ an aromatic alkylate in which an aromatic nucleus such as benzene, xylene, naphthalene, etc. is alkylated with long chain olefines such as polyisobutylene, polypropylene, cracked paraffin wax, etc. In general, I employ hydrocarbons boiling above about 600° F. as the charge to the sulfonation reaction. These stocks usually have a Saybolt Universal viscosity at 100° F. in the range of about 100–600 sec.

It is desirable that the oil employed be partially refined before sulfonation to eliminate readily carbonized constituents of an unsaturated nature. For this purpose, treatment with 93 to 98% $H_2SO_4$ is satisfactory. Aluminum chloride, fuller's earth and/or other reagent effecting polymerization of olefines can be employed also. Controlled solvent extraction with furfural, phenol, etc. can be employed to remove a large portion of the sludge forming constituents without removing excessive amounts of the desirable sulfonatable constituents.

Acid employed for sulfonation can be sulfuric acid above about 98% $H_2SO_4$ concentration. Fuming acid of 104% to 120% is usually employed. It is important to control the temperature of the reaction not to exceed about 140° F., in order to avoid destruction of the desired sulfonates. It is also important to restrict the time of contact between the acid and the oil for the same reason. Excellent results can be obtained by mixing and cooling in stages. Thus the reaction mixture from mixer 11 passes through cooling coil 13, then to mixer 14, where it is mixed with more acid charged by line 15. Thorough mixing is facilitated by recycling the mix with pump 16.

The additional acid added through line 15 may have a higher concentration than the acid added by line 12. Thus the initial acid may have a strength of 104% while the acid charged at 15 can be 120%. Likewise, the amount of acid charged at the later stages can be increased. Any convenient number of acid injection stages can be employed but usually two or three stages are sufficient. Sludge may also be withdrawn between treating stages if desired.

From mixer 17, the oil and acid are recycled through cooler 18 by pump 19, thence flowing to cooler 20 and through line 21 to settler 22. It is usually desirable to add a small amount of water by line 23 to reduce the strength of the acid and terminate the sulfonation reaction. About 1 to 3% of water based on the oil charged is sufficient. Water also aids in the separation of sludge in settler 22. Heat produced in dilution of the acid is removed by cooler 20.

Separation of sludge from oil in 22 is facilitated by adding a hydrocarbon solvent by line 24 and for this purpose, about ¼ volume to 1½ volumes per volume of acid oil is effective. Petroleum naphtha boiling in the range of about 160 to 350° F. is suitable but I prefer to use aromatic hydrocarbon solvents such as benzene, toluene, xylene or cracked or reformed naphthas high in aromatic components. The aromatic hydrocarbon solvents have the advantage of extracting a higher proportion of the desired oil soluble sulfonic acids from the sludge layer. Besides giving an increase in the yield, the solvent also produces a lighter color in the final product.

In settler 22, a sludge layer comprising the green acids, sulfuric acid and some entrained oil is withdrawn by line 25 and discarded from the system. If desired, the sludge may be processed to recover sulfuric acid and the green acids by means well known in the art. Also the sludge may be re-extracted with fresh hydrocarbon solvent which extract may be used to extract the primary reaction mixture in line 21, thus furnishing a countercurrent use of the solvent.

The upper layer in settler 22 comprising unreacted oil and oil soluble sulfonic acids together with solvent if one is used, is drawn off by line 26 to mixer 27 wherein it is neutralized with ammonium hydroxide introduced by line 28. It is desirable to employ an ammonia solution of about 10 to 30 percent by weight in an amount sufficient to completely neutralize the acid in the oil stream with some excess. Mixer 27 and line 26 can be resistant to dilute acid, for example lead or stainless steel may be employed in their construction.

From mixer 27 the oil flows to solvent stripper 29 where the hydrocarbon solvent is stripped off with steam or heat from coil 30. Solvent vapors, $NH_3$ and steam pass by line 31 to condenser 32 and thence to absorber 33 wherein the ammonia is absorbed from the solvent by a water stream entering by line 34 and leaving by line 35. The solvent stream flows thence by line 36 to solvent storage 37. If desired, an aqueous layer or ammonium sulfate brine can be separated from the stream leaving mixer 27 before stripping by means not shown.

From the stripper 29 the sulfonate-oil stream passes by line 38 to mixer 39 then into settler 40. Partitioning solvent is added to the oil stream in mixer 39, entering by line 41. For this purpose I prefer to use a butyl alcohol, for example secondary butyl alcohol, although I may also use amyl and hexyl alcohol. Alcohols and amines of four to six carbon atoms are generally suitable, the preferred solvent being preferentially soluble in oil but also appreciably soluble in water. Triethyl amine and mixtures thereof and mixtures with alcohols can be used. The preferred amount of partitioning solvent is about 10 to 40 parts per 100 parts of oil and sulfonate with water in proportions of about 20 to 60 parts per 100 parts of oil and sulfonate. In some cases we may wish to increase the ratio of solvent to sulfonate and oil to equal parts or more maintaining a sufficient ratio of water to sulfonate to give an aqueous brine phase upon settling, containing ammonium sulfate. With higher ratios of alcohol and decreasing ratios of water with respect to oil and sulfonate, crystals of ammonium sulfate are precipitated along with decreasing amounts of brine. When no water is added, and the ratio of alcohol is high, all the $(NH_4)_2SO_4$ can be separated as a solid by centrifuging, settling or filtering the mixture of alcohol, oil and sulfonate. After removal of $(NH_4)_2SO_4$, either as a concentrated brine or crystals, the salt-free solution can then be treated with water in the proportions given above to effect separation of lubricating oil from the mixture.

The mixture of oil, solvent and water is held in settler 40 for sufficient time to effect a separation into two or three layers, depending on conditions. The separation is facilitated by holding the temperature at about 140 to 180° F., and maintaining the hydrogen ion concentration at about pH 6 to 9 which is readily done by removing excess $NH_3$ in stripper 29. The bottom layer in settler 40 comprising ammonium sulfate, water and a small amount of green acid sulfonate is drawn off by line 42 to heater 43 and stripper 44. A basic metal hydroxide such as lime slurry is introduced by line 45 in an amount sufficient to liberate all the $NH_3$ and other basic nitrogen compound which may be present. Heat supplied by coil 46 in tripper 44 drives off the $NH_3$ through line 47 leading to condenser 48, thence to separator 49 wherein the solvent separates from the water and ammonia and is ready for re-use in the system. The lime slop from the base of stripper 44 comprised of $Ca(OH)_2$ and $CaSO_4$ is discharged from the system by line 50.

In a similar manner the ammonium sulfonate phase is withdrawn by line 51, heated in heater 52 with lime or other metal hydroxide or oxide base introduced by line 53. The sulfonate passes thence to separator 52a, where the aqueous phase is separated and withdrawn by line 52b, leading to stripper 44. The upper layer in 52a, comprised of metal sulfonate and solvent with dissolved ammonia, passes by line 54 to stripper 55 where vapors of ammonia and water are removed through line 56. When desired to produce a highly alkaline product, additional $Ca(OH)_2$ slurry is introduced into line 54 by means not shown. Also—the mixture entering stripper 55 may be reheated to a higher temperature by suitable means not shown in order to facilitate both alkalizing and distillation operations conducted in stripper 55. The concentrated calcium sulfonate or other metal sulfonate corresponding with metal hydroxide introduced by line 53, is withdrawn through line 57 to filter 58, thence to storage tank 59. Diatomaceous earth filter aid can be introduced by line 60, if desired, to give a bright product and remove cloud.

The upper layer in settler 40 is a clear oil with a trace of sulfonate containing some partitioning solvent. It is drawn to stripper 61 where $NH_3$, alcohol and water are taken overhead through vapor lines 62 and 47. Lime introduced at 63 converts the trace of ammonium sulfonate to calcium sulfonate in heater 64. Oil from 61 passes by line 65 to filter 66 and storage tank 67, filter acid being introduced at 68. If desired, the by-product oil in 67 can be blended with the sulfonate in 59 by line 69 leading to tank 70 to provide a product of the desired sulfonate content.

Make-up ammonia can be supplied to the system in the form of anhydrous or aqueous ammonia. Use of anhydrous ammonia has the advantage of balancing the water in the system more easily. When employing hydrocarbon solvent to aid sludge separation in settler 22, it is desirable to avoid introducing partitioning solvent into neutralizing mixer 27. By maintaining a high concentration of $NH_4OH$ in supply tank 49, the solubility of the partitioning solvent therein is reduced to a negligible amount. When no hydrocarbon solvent is employed in the system, the stripper 29 is bypassed by a line not shown passing from mixer 27 directly to settler 40, and the partitioning solvent stream is introduced with the ammonia into mixer 27.

When employing an amine as the partitioning solvent such as di ethyl or di propyl amine, I can dispense with the use of ammonia by supplying sufficient solvent to effect the neutralization of the sulfonic acids, sulfuric acid and other acids remaining in the oil after separation of sludge. The use of hydrocarbon solvent should be avoided when operating in this manner because of contamination of one solvent with the other and possible loss of amine solvent in the acid sludge withdrawn at 25, unless the two solvents are separated during recovery by efficient fractionation.

Another modification of my process involves the use of preferentially water soluble partitioning solvents as exemplified by methyl, ethyl and isopropyl alcohol, in combination with an aromatic hydrocarbon solvent such as benzene, toluene or xylene. The water soluble solvent is referred to herein as a "polar solvent," and includes certain of the water soluble amines. A plant operating in this way is shown in flow diagram in Figure 2. Oleum from line 80 and sulfonatable hydrocarbon oil from line 81 are mixed in mixer 82, cooled in coil 83, recycled and mixed further in centrifugal pump 84, and mixed in 85 with a second portion of acid from line 86, cooled in coil 87 and recycled by pump 88. The temperature of the sulfonation is held below about 140° F. to avoid overtreating. A small amount of water is next added by line 89 and the heat of dilution is absorbed by mixer 90. The water reduces the acid concentration to a point where sulfonation is largely checked. An aromatic solvent is then introduced by line 91 to dilute the oil by about ¼ to 1½ volume of solvent per volume of oil treated. It is important to dilute the acid with sufficient water to prevent sulfonation of the aromatic solvent and consequent formation of low molecular weight sulfonic acids. Excessive water must be avoided, however, owing to the release of undesirable color bodies from the sludge by the action of water.

The acid oil and solvent passes by line 92 to settler 93 where the sludge drops out and is withdrawn by line 94. Instead of operating in a continuous manner as shown, I may settle the sludge batchwise in a tank. The oil layer containing the desired mahogany acids which are preferentially oil soluble, is withdrawn by line 95 to neutralizing mixer 96 where it is rapidly neutralized with aqueous ammonia and simultaneously mixed with polar solvent introduced by line 97. The amount of polar solvent required is preferably about equal to the volume of aromatic solvent present but the ratio can be varied, for example from about 1:3 to about 3:1. The amount of water employed is usually about equal to the volume of polar solvent, varying from about 1:2 to about 2:1. Excess $NH_4OH$ can be employed if desired to assure neutrality.

From mixer 96 the oil and solvent mixture passes by line 98 to settler 99 where there are formed two or three distinct phases, depending on the ratio of solvent to water and oil. On the bottom is a brine layer consisting mainly of water and $(NH_4)_2SO_4$ with some undesired ammonium salts of preferentially water soluble sulfonic acids. This phase is withdrawn by line 100 leading to heater 101 and stripper 102. A strong inorganic base is introduced by line 103 to liberate the ammonia from the brine. In stripper 102 the $NH_3$ and solvent vapors are led by line 104 to condenser 105, thence to separator and storage reservoir 106 wherein the hydrocarbon solvent forms an upper layer with the ammonia solution of the polar solvent on the bottom. From the bottom of stripper 102, the sludge of calcium sulfate and excess calcium hydroxide free of ammonium salts and solvent is discarded by line 107. The ammonium sulfonate phase is withdrawn from settler 99 by line 108 leading through heater 109 and thence to separator 109a. A metal oxide or hydroxide, for example lime, is introduced by line 111 to convert the ammonium sulfonate to metal sulfonate. An aqueous phase separating in 109a is withdrawn by line 109c leading to stripper 102 for recovery of ammonia and solvent contained therein. The metal sulfonate layer is conducted by line 109b to stripper 110 where the liberated ammonia, water and solvent vapors are expelled through line 112. Ammonia and solvent vapors, mostly polar solvent, are conducted by line 104 through condenser 105 to storage reservoir 106. Ammonia, polar solvent and water collect in the bottom of reservoir 106 while the hydrocarbon solvent forms an upper layer therein. Solvent-free sulfonate in oil with some excess lime passes by line 113 to filter 114 and thence to storage tank 115. Filter cel can be introduced by line 116 to brighten the product when needed.

When it is desired to manufacture ammonium sulfonate without conversion to metal sulfonate, the introduction of lime or other metal base by line 111 is omitted. When operating in this manner, stripper 110 serves to eliminate solvent and water from the sulfonate, producing a clear solution of ammonium sulfonate and hydrocarbon oil, e. g. 25–50%, which can be filtered in 114 in the same manner as the metal sulfonate when desired. To prevent development of acidity in the ammonium sulfonate by hydrolysis, $NH_3$ gas can be introduced in a slow stream into the base of stripper tower 110. Ammonium sulfonate prepared in this manner can be stored as an intermediate product and later converted to any desired metal sulfonate by mixing with a suitable metallic base and heating to expel ammonia vapors.

Before the hydrocarbon solvent in tank 106 can be recycled to the acid oil in line 92, it must be freed of $NH_3$ and polar solvent. This is accomplished by scrubbing with water in scrubber 127, the solvent entering the scrubber by line 128 and leaving by line 91. Extracted $NH_3$ and polar solvent in water passes by line 130 to storage tank 106, water being supplied to the scrubber by line 131. Makeup hydrocarbon solvent is supplied by line 132 while polar solvent is supplied from tank 133 to make up losses. Makeup ammonia is supplied by tank 134.

In describing the invention particularly with reference to the drawings I have described the use of lime to convert the ammonium sulfonate to calcium sulfonate, but it should be understood that other bases such as the hydroxides of sodium, lithium, potassium, strontium and barium, may be employed to produce the corresponding sulfonate. In fact, I may employ any base, oxide or hydroxide which is capable of displacing ammonia from the ammonium sulfonate solution in polar solvent. Distillation of solvent from the mixture accelerates the conversion by shifting the equilibrium with removal of $NH_3$ with the solvent vapors. At the same time, the polar solvent in combination with water ionizes the basic metal compound. I may thus effect conversion with metal oxides and hydroxides of very slight basicity such as zinc, aluminum, lead, cadmium, molybdenum, magnesium, copper, etc.

In carrying out my process, it is not necessary to concentrate the sulfonate for many purposes and I may adjust the conditions of solvent, water and temperature to separate only two phases in settlers 40 and 99, an oil-sulfonate phase and an aqueous phase.

I have found that the conversion of ammonium sulfonate in oil solution with excess metal base yields a basic metal sulfonate which has a high alkali value because of the presence of metal oxide or hydroxide above the stoichiometric amount. Where the metal sulfonates are used to control corrosion, and also as engine oil additives, the excess metal is an important advantage. For some purposes I may prepare the ammonium sulfonate without conversion to metal sulfonate. Thus I may employ ammonium sulfonate in anti-rust oils in which case I prefer to add a slight excess of $NH_3$ to render the sulfonate basic, by an amount of 10 to 50 mg. KOH per gram equivalent, for example.

In describing the separation of sludge from sulfonated oil, I have specified the use of aromatic hydrocarbon solvents which reduce the viscosity of the oil and improve sludge separation. They also can increase the yield of sulfonate by extracting oil soluble sulfonic acid from the sludge phase. In addition to aromatic hydrocarbon solvents, I can also use paraffinic type solvents such as petroleum naphtha, particularly in that modification of my process shown in Figure 1. Owing to the lower solvent power of the paraffinic hydrocarbons for mahogany sulfonic acid, a larger proportion of paraffinic solvent is required to obtain maximum yield of mahogany sulfonic acids.

Although I have described specific procedures for purifying the ammonium sulfonate produced in accordance with my process, it should be understood that my invention is not limited thereby but that any conventional procedure may be employed for extracting the ammonium sulfonate and separating ammonium sulfate therefrom prior to conversion to metal sulfonate. Thus I may employ anhydrous isopropyl alcohol, anhydrous methyl or ethyl alcohols alone or in combination with benzene or other hydrocarbon solvent for the separation of ammonium sulfate from the ammonium sulfonate phase. In general, however, extraction with butyl alcohol is preferred.

Having thus described my invention, what I claim is:
1. The method of making oil soluble sulfonates of metals which comprises sulfonating an aromatic type hydrocarbon lubricating oil, adding a hydrocarbon solvent, separating acid oil, containing dissolved oil soluble sulfonic acids and solvent from excess acid and sludge, neu- tralizing said acid oil and solvent solution, with ammonia, thereby converting the said sulfonic acids to ammonium sulfonates, heating said oil and sulfonates with a basic metal compound, thereby expelling vapors of ammonia and solvent and forming the metal sulfonate and recovering the oil and dissolved metal sulfonate.

2. The method of claim 1 wherein said basic metal compound is calcium hydroxide.

3. The method of claim 1 wherein said basic metal compound is sodium hydroxide.

4. The method of claim 1 wherein said basic metal compound is barium hydroxide.

5. The method of claim 1, wherein said ammonium sulfonates are purified to remove ammonium sulfate before heating with said basic metal compound.

6. The method of making oil soluble sulfonates of metals which comprises sulfonating a hydrocarbon having a boiling point above about 600° F., separating the sulfonated oil from excess acid and sludge, in the presence of a solvent for said oil, neutralizing the sulfonated oil with ammonia and removing solvent and excess ammonia from said oil, preparing a mixture of the oil with water and a polar solvent of the class consisting of alcohols and amines having not more than six carbon atoms which is substantially soluble in water and also in oil, allowing the mixture to separate into three phases, an aqueous phase, a sulfonate phase and an oil phase, separating the sulfonate phase, heating it with a basic metal-oxygen compound, thereby liberating ammonia vapor and converting the sulfonate to a metal sulfonate and recovering said metal sulfonate.

7. The method of claim 6 wherein said polar solvent is an alcohol.

8. The method of claim 6 wherein said polar solvent is an amine.

9. The method of making sulfonates of metals which comprises sulfonating an aromatic lubricating oil with fuming sulfuric acid under controlled temperature conditions to give an oil containing about ten to thirty percent of sulfonic acid, adding sufficient water to substantially prevent further sulfonation, adding an aromatic hydrocarbon solvent to assist separation of sludge, removing the sulfonated oil phase and solvent from excess acid and sludge, neutralizing the sulfonated oil with ammonia and water, adding a polar solvent selected from the class consisting of alcohols and amines having not more than six carbon atoms miscible with water in all proportions which is also a solvent for oil, separating the oil, water and solvent into at least two phases, an aqueous phase containing ammonium salts and a sulfonate phase, separating the sulfonate phase and heating it with a basic metal compound while withdrawing vapors of solvent and ammonia, recovering the solvent and ammonia for reuse in the system and recovering the metal sulfonate.

References Cited in the file of this patent

UNITED STATES PATENTS

| Number | Name | Date |
|---|---|---|
| 1,524,859 | Forrest et al. | Feb. 3, 1925 |
| 2,121,845 | Wernicke | June 28, 1938 |
| 2,187,883 | Lemmon | Jan. 23, 1940 |
| 2,307,953 | Potter | Jan. 12, 1943 |
| 2,397,191 | Meyer | Mar. 26, 1946 |
| 2,406,763 | Griesinger | Sept. 3, 1946 |
| 2,451,549 | Gzemski | Oct. 19, 1948 |
| 2,453,690 | Bray | Nov. 16, 1948 |
| 2,487,080 | Swenson | Nov. 8, 1949 |
| 2,509,863 | Harlan | May 30, 1950 |
| 2,543,885 | Wilson | Mar. 6, 1951 |
| 2,559,439 | Jones et al. | July 3, 1951 |
| 2,578,657 | Anderson et al. | Dec. 18, 1951 |
| 2,650,198 | Kronig et al. | Aug. 25, 1953 |